US009548930B1

(12) United States Patent
Hardie

(10) Patent No.: US 9,548,930 B1
(45) Date of Patent: Jan. 17, 2017

(54) METHOD FOR IMPROVING LINK SELECTION AT THE BORDERS OF SDN AND TRADITIONAL NETWORKS

(71) Applicant: Google Inc., Mountain View, CA (US)

(72) Inventor: Edward Thomas Lingham Hardie, Redwood City, CA (US)

(73) Assignee: Google Inc., Mountain View, CA (US)

( * ) Notice: Subject to any disclaimer, the term of this patent is extended or adjusted under 35 U.S.C. 154(b) by 204 days.

(21) Appl. No.: 14/290,455

(22) Filed: May 29, 2014

Related U.S. Application Data

(60) Provisional application No. 61/991,301, filed on May 9, 2014.

(51) Int. Cl.
*H04L 12/26* (2006.01)
*H04L 12/801* (2013.01)

(52) U.S. Cl.
CPC .................................. *H04L 47/18* (2013.01)

(58) Field of Classification Search
None
See application file for complete search history.

(56) References Cited

U.S. PATENT DOCUMENTS

| 8,385,207 B2 | 2/2013 | Gusat et al. | |
|---|---|---|---|
| 2007/0047446 A1* | 3/2007 | Dalal | H04L 45/02 370/237 |
| 2011/0261688 A1* | 10/2011 | Sharma | H04L 41/5022 370/230 |
| 2013/0114412 A1 | 5/2013 | Crisan et al. | |
| 2013/0322252 A1 | 12/2013 | Decusatis et al. | |
| 2014/0189074 A1* | 7/2014 | Parker | H04L 63/20 709/220 |
| 2014/0192646 A1* | 7/2014 | Mir | H04L 43/0829 370/235 |

OTHER PUBLICATIONS

Argyropoulos, C., Kalogeras, D., Androulidakis, G., & Maglaris, V. PaFloMon—A Slice Aware Passive Flow Monitoring Framework for OpenFlow Enabled Experimental Facilities, In 2012 European Workshop on Software Defined Networking (EWSDN), pp. 97-102, IEEE (Oct. 2012).

* cited by examiner

*Primary Examiner* — Steven H Nguyen
*Assistant Examiner* — Sithu Ko
(74) *Attorney, Agent, or Firm* — McDermott Will & Emery LLP

(57) ABSTRACT

Methods and systems wherein a first network device in a first network maintains attribute information for one or more routes to one or more network devices external to the first network. The first network device is configured to identify that a first route to the second network device external to the first network has a particular network traffic management capability, and to update the attribute information to indicate that the first route to the second network device has the network traffic management capability. The first network device is configured to select the first route for a new network packet flow from the first network to the second network device, based on the recorded information, and route the new network packet flow to an external network in the first route. In some implementations, the first network is a software-defined network.

18 Claims, 6 Drawing Sheets

| | 00000000 01234567 | 00111111 89012345 | 11112222 67890123 | 22222233 45678901 |
|---|---|---|---|---|
| 0 | End of New Packet Preamble and Delimiter Bits | | MAC Destination Address (6 Bytes) | |
| 1 | MAC Destination (Continued) | | | |
| 2 | MAC Source Address (6 Bytes) | | | |
| 3 | MAC Source Address (Cont.) | | Ethertype | |
| 4 | IP Ver. | IHL (length) | DSCP (QoS) | ECN | Packet Length | |
| 5 | Identification | | Flags | Fragment Offset |
| 6 | Time to Live (TTL) | Protocol | Header Checksum | |
| 7 | Source IP Address | | | |
| 8 | Destination IP Address | | | |
| 9 | Source Port | | Destination Port | |
| 10 | Sequence Number | | | |
| 11 | Acknowledgment Number | | | |
| 12 | Data Offset | Not Used | Control Flags | Window Size |
| 13 | Checksum | | Urgent Pointer / Options / Zero Pad | |
| 14 | Begin Data ... | | | |

METHOD FOR IMPROVING LINK SELECTION AT THE BORDERS OF SDN AND TRADITIONAL NETWORKS

CROSS-REFERENCE TO RELATED APPLICATIONS

This application claims the benefit of U.S. Provisional Application No. 61/991,301, titled "A Method for Improving Link Selection at the Borders of SDN and Traditional Networks," filed May 9, 2014, hereby incorporated by reference in its entirety.

BACKGROUND

A network consists of network devices linked together and managed by a network operator. The network devices exchange data in the form of packets transmitted over links. Two networks may meet at a network edge, and the network operators for the two networks may have an agreement to allow exchange of data at the network edge. A network device in a first network may address packets to a network device in another network, requiring the packets to be transmitted across a network edge. When these packets travel through multiple networks, there may be alternative routing options. The network devices determine which route will be used in accordance with one or more networking protocols.

SUMMARY

In one aspect, the disclosure relates to a method. The method includes maintaining, by a first network device in a first network, a set of data records that includes attributes for one or more routes to one or more network devices external to the first network. The method includes identifying, by the first network device in the first network, that a first route to a second network device external to the first network has a network traffic management capability, and updating, by the first network device, the set of data records to record an attribute for the first route to the second network device that indicates that the first route has the network traffic management capability. The method further includes selecting, by the first network device, the first route for a new network packet flow from the first network to the second network device, based on the set of data records, and routing, by the first network device, the new network packet flow to an external network in the first route.

In one aspect, the disclosure relates to a system that includes a first network device in a first network, the first network linked by interconnects to a plurality of third-party networks through which the network device can send packets to, and receive packets from, a second network device external to the first network. The first network device is configured to maintain a set of data records that includes attributes for one or more routes to one or more network devices external to the first network. The first network device is configured to identify that a first route to the second network device external to the first network has a network traffic management capability, and to update the set of data records to record an attribute for the first route to the second network device that indicates that the first route has the network traffic management capability. The first network device is configured to select the first route for a new network packet flow from the first network to the second network device, based on the set of data records, and route the new network packet flow to an external network in the first route.

BRIEF DESCRIPTION OF THE DRAWINGS

The above and related objects, features, and advantages of the present disclosure will be more fully understood by reference to the following detailed description, when taken in conjunction with the following figures, wherein:

FIG. 3 is the layout for a typical TCP/IPv4 packet header, including the Ethernet frame;

Like reference numbers and designations in the various drawings indicate like elements.

DETAILED DESCRIPTION

Figure 1:
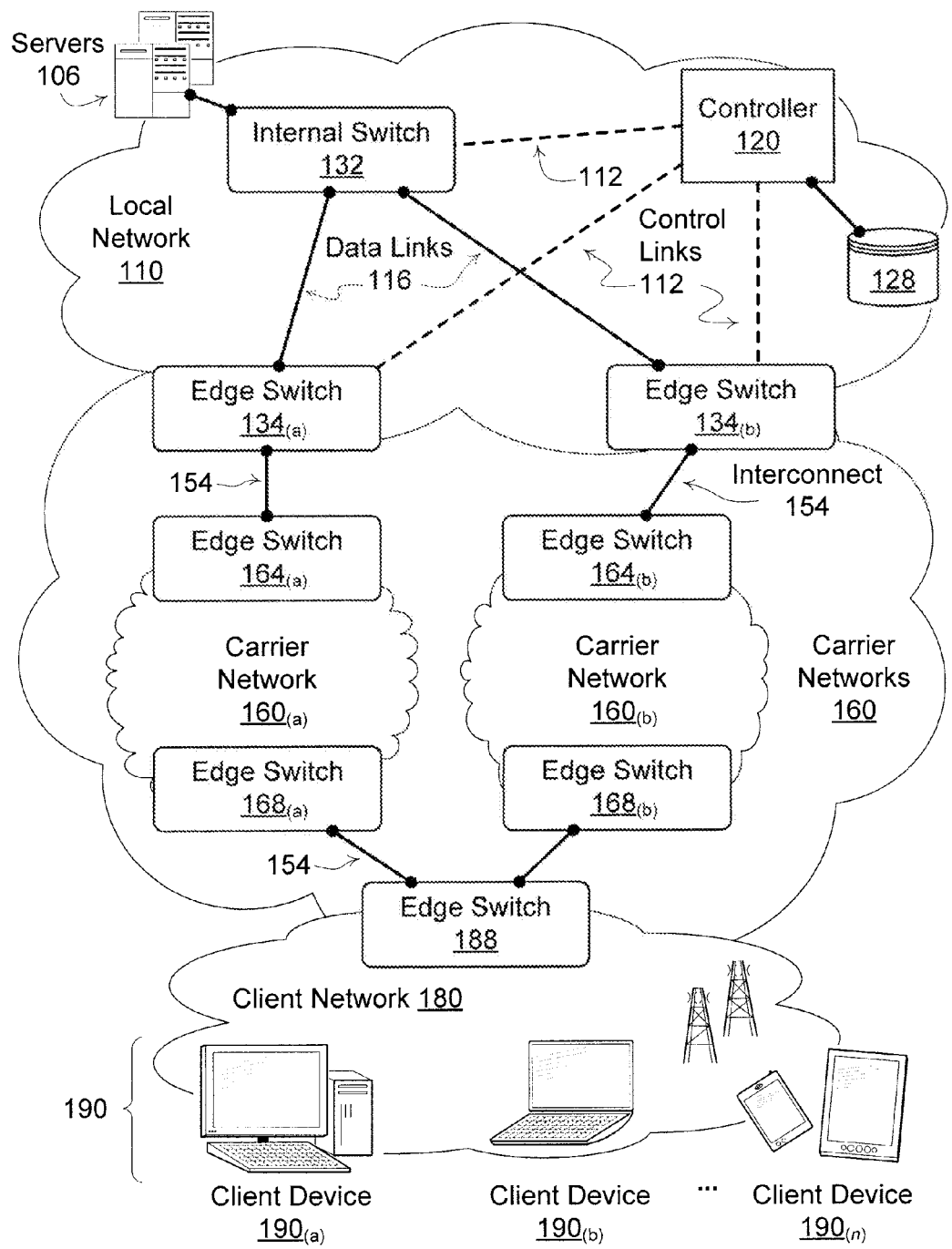
FIG. 1 is a block diagram of an example network environment.

Network traffic between devices in two different networks may travel through one or more intermediary networks. In some instances, a source network may have the opportunity to choose between multiple routes through intermediary networks. The decision to route network traffic through one network, as compared to through another intermediary network, may be based on one or more criteria. The criteria can include, for example, transit costs, round trip time, reliability, route stability, and/or protocol support.

In some implementations, a network device in a first network identifies routes to a network device in a second network where the identified routes support one or more particular protocols and/or have support for one or more network traffic management capabilities. In some implementations, the network device in the first network is an edge switch. In some implementations, the network device in the first network is a controller for a software-defined network (SDN). In some implementations, the SDN controller maintains a table of destinations (or a table of paths to destinations). A destination, in this context, is either an end-host for a network flow (typically a stream recipient) or a "last hop" switch to an end-host, where there are no significant route changes between the "last hop" switch and the end-host, but there may be network devices such as static routers, hubs, bridges, and the like, between the last hop switch and the end-host device. For each destination, there are one or more possible routes between the first network, e.g., the SDN, and the destination, each route passing through one or more "external" networks, e.g., networks that are not supervised or managed by the SDN controller. For example, the external networks may be third-party networks, e.g., long-haul backbone networks, peer networks, transit networks, network service providers (ISPs), etc.

In some implementations, an SDN controller can select which of multiple possible external networks to use for each flow, e.g., by routing the flow to an interconnect point (e.g., peering point) with a particular external network. In some implementations, the SDN controller maintains, in the table of destinations, information for selecting which external networks are preferred for each destination. In some implementations, the information includes properties of the external networks determined by observation of flows through the respective networks. For example, the table may indicate whether a network is capable of active queue management (AQM-capable) based on whether or not explicit congestion notification (ECN) information is observed on flows passing through the network.

In some implementations, a network device at the edge of the first network inserts ECN request indicators into outgoing packets of a flow and monitors incoming packets of the flow for ECN status indicators, regardless of whether the flow uses ECN within the first network. In some such implementations, the network device at the edge of the first network removes ECN indicators from incoming packets of the flow. That is, in some implementations, when an edge device inserts ECN request indicators into a flow, the edge device also removes any resulting ECN response data.

FIG. 1 is a block diagram of an example network environment facilitating communication between servers 106 and client devices 190. In broad overview, the illustrated network environment includes multiple independent networks linked together at various interconnect points. For example, the servers 106 participate in a local network 110 that is connected to a client network 180 through one or more carrier networks 160. The client network 180 connects the client devices 190 to the network environment. In many instances there are multiple possible routes from the servers 106 in the local network 110 to a client device 190 in the client network 180. For example, FIG. 1 illustrates two carrier networks $160_a$ and $160_b$, either of which might be used for a route from a server 106 to a client device 190.

Figure 6:
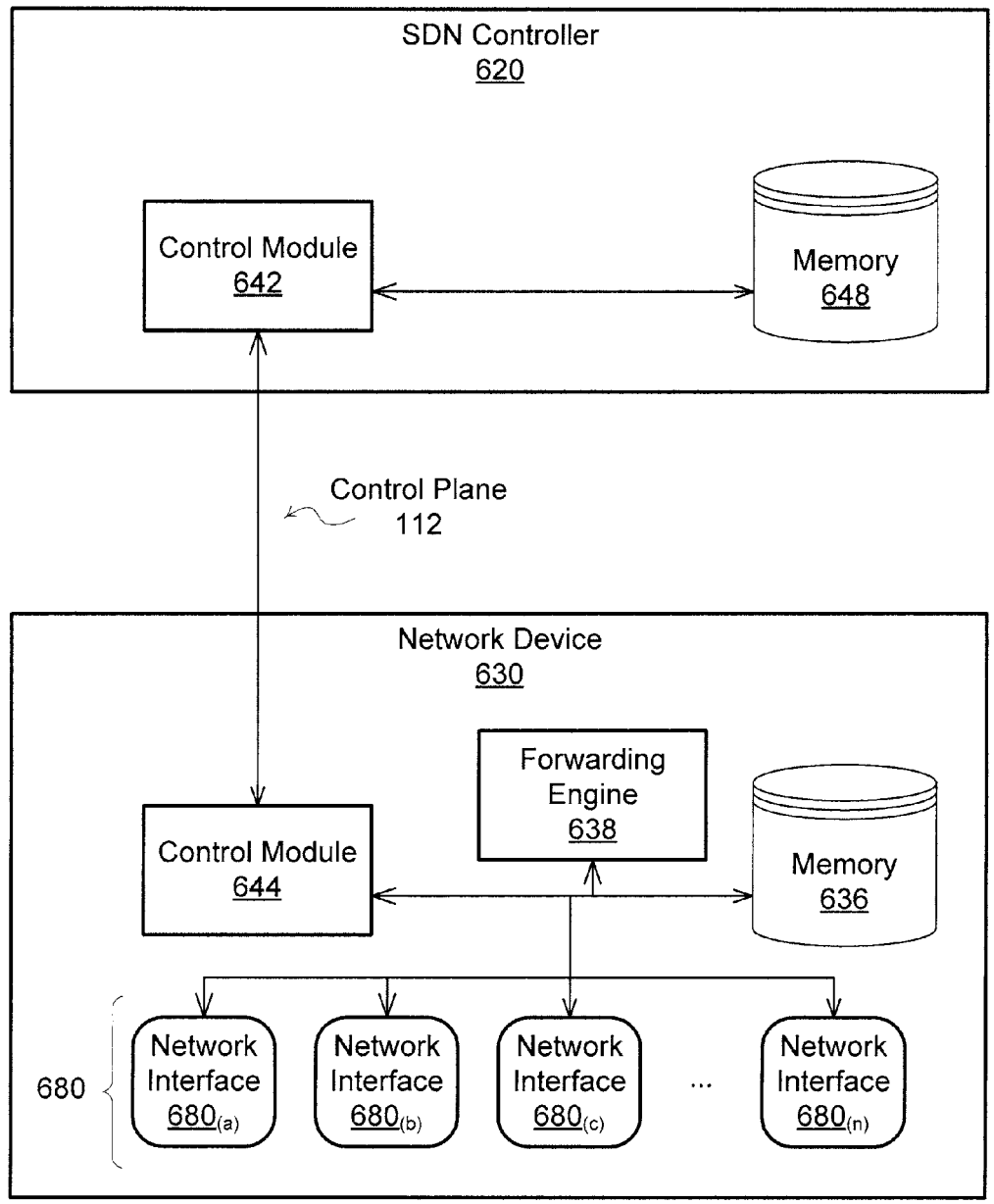
FIG. 6 is a block diagram of an SDN controller and SDN network device.
Figure 7:
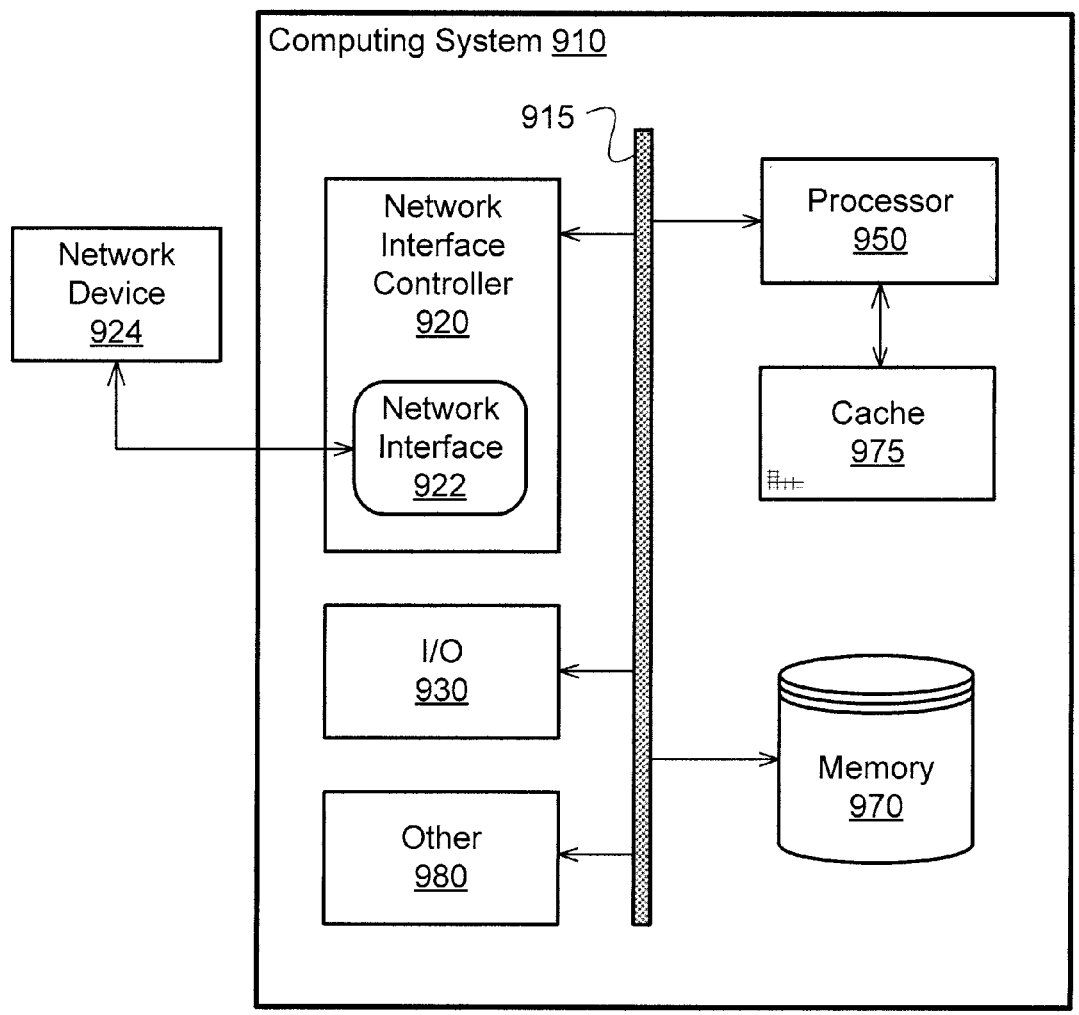
FIG. 7 is a block diagram of a computing system in accordance with an illustrative implementation.

Referring to FIG. 1, in more detail, the local network 110 includes one or more servers 106, one or more internal switches 132, and one or more edge switches $134_a$ and $134_b$. A server 106 is an information source, e.g., a source that originates a flow of packets through the networks 110, 160, and 180. The servers 106 are linked to internal switches 132, connecting the servers 106 to the edge switches $134_a$ and $134_b$ at the edge of the local network 110. For example, the network 110 may be a datacenter with servers (e.g., application servers, data servers, or any other type of server) arranged in a hierarchical network of internal switches. In some implementations, as illustrated in FIG. 1, the network 110 is a software defined network (SDN) wherein one or more network devices are controlled by a distinct SDN controller 120. For example, the internal switches 132 and/or the edge switches $134_a$ and $134_b$ may be implemented using a network device 640 as illustrated in FIG. 6. In some implementations, each server 106 is a physical computing device including memory, one or more processors, and a network interface, e.g., as illustrated in FIG. 7. In some implementations, a server 106 may be a virtual machine. In some implementations, the local network 110 includes additional network devices, such as hubs, bridges, or routers, connecting the servers 106 to the internal switches 132 and/or to the edge switches $134_a$ and $134_b$.

Referring to FIG. 1, the SDN controller 120 controls network devices, e.g., internal switches 132 and edge switches $134_a$ and $134_b$, by sending control messages via control links 112. These control messages form a control plane. Other network traffic is transmitted between network devices using data links 116, forming a data plane. In some SDN implementations, the control plane and the data plane share physical links. In some SDN implementations, the control plane and the data plane use separate physical links.

The SDN controller 120 includes, or is connected to, memory 128. The SDN memory 128 stores information used for controlling the network 110. For example, the SDN memory 128 may store information about the state of the network 110, information about the state of packet flows through the network 110, and/or information about other networks participating in packet flows through the network 110. In some implementations, the SDN memory 128 is provided by a distinct data server. In some implementations, the SDN memory 128 is a network-attached storage (NAS) device. In some implementations, the SDN memory 128 is part of the SDN controller 120, e.g., as illustrated by the memory 648 in FIG. 6.

The local network 110 includes edge switches $134_a$ and $134_b$ that each participate in an interconnect 154 with another network, e.g., a carrier network 160. Each network shown in FIG. 1 includes at least one edge switch. Each edge switch $134_a$, $134_b$, $164_a$, $164_b$, $168_a$, $168_b$, and 188, is positioned at the border of two networks. As a packet leaves a network (e.g., the local network 110), the edge switch (e.g., local network edge switch $134_a$) is the last network device controlled by a network operator for that network before the packet exits the network. Likewise, an edge switch (e.g., client network edge switch 188) is the first network device of a network (e.g., client network 180) to handle a packet entering the network. In some implementations, the edge switches implement routing protocols such as the Border Gateway Protocol (BGP). In some implementations, one or more of the edge switches is a SDN device controlled by a separate SDN controller. For example, the edge switches $134_a$ and $134_b$ of the local network 110 are controlled by an SDN controller 120 for the local network 110.

Each interconnect 154 connects an edge switch from a first network (e.g., edge switch $134_a$) to an edge switch of another network (e.g., edge switch $164_a$). Typically, large networks physically interconnect at one or more locations. A local network 110 can host a multi-homed network device with connections both to the local network 110 and to another network 160. In some instances, large networks physically interconnect at Internet eXchange Points (IXPs). An IXP is a co-location center that is generally operated by a third-party independent of the operators of the interconnected networks. The IXP maintains one or more interconnect fabrics and provides physical space for customer equipment. Thus network traffic can originate in a first network and pass through an interconnect 154 into a second network. Network interactions may traverse several networks in this manner. For example, a server 106 in a local network 110 may interact with a client device 190 in a client network 180 via one or more carrier networks 160, which are typically (but not necessarily) operated by a third-party.

Referring still to FIG. 1, two carrier networks $160_a$ and $160_b$ are shown connecting the local network 110 to the client network 180. The carrier networks $160_a$ and $160_b$ are alternative paths A and B through which data can be routed from the servers 106 to a client device 190. Each carrier network $160_a$ and $160_b$ includes an edge switch $164_a$ or $164_b$ with an interconnect 154 to the local network 110, an internal network made up of links and network devices (not shown), and an edge switch $168_a$ or $168_b$ with an interconnect 154 to the client network 180. Internally, the carrier networks $160_a$ and $160_b$ may each include satellite links, radio links, microwave links, fiber optic links, copper links, or any other medium of data communication.

The carrier networks 160 connect (directly or indirectly) to additional networks, e.g., a client network 180 that includes client devices 190 in communication with the servers 106. For example, the client network 180 may be an Internet Service Provider (ISP) network for a user of a client device 190. In some implementations, the carrier network 160 is, or includes, the client network 180. The client network 180 includes an edge switch 188 with an interconnect 154 to one or more carrier networks 160, an internal network made up of links and network devices (not shown), and a link to a client device 190. Internally, the client network 180 may include satellite links, radio links, microwave links, fiber optic links, copper links, or any other medium of data communication. In some implementations, the client network 180 includes cellular base stations providing mobile broadband support.

The client devices 190 are any computing system capable of receiving packets from the servers 106. Users receive data from the server 106 at the client devices 190 via the client network 180. For example, a user of a device 190 may receive a video stream from a server 106. The client device 190 may be a desktop computer 190$_a$, a laptop 190$_b$, or a mobile device 190$_{(c)}$ such as a smart phone or tablet. In some implementations, the client device 190 can be a television set-top box, a gaming device, or an entertainment appliance. The client device 190 can be any computing device configured for access to a network. The client device 190 may be a multi-purpose device or a comparatively limited specific-purpose device. In some implementations, a client device 190 is a physical computing device including memory, one or more processors, and a network interface, e.g., as illustrated in FIG. 7.

Figure 2:
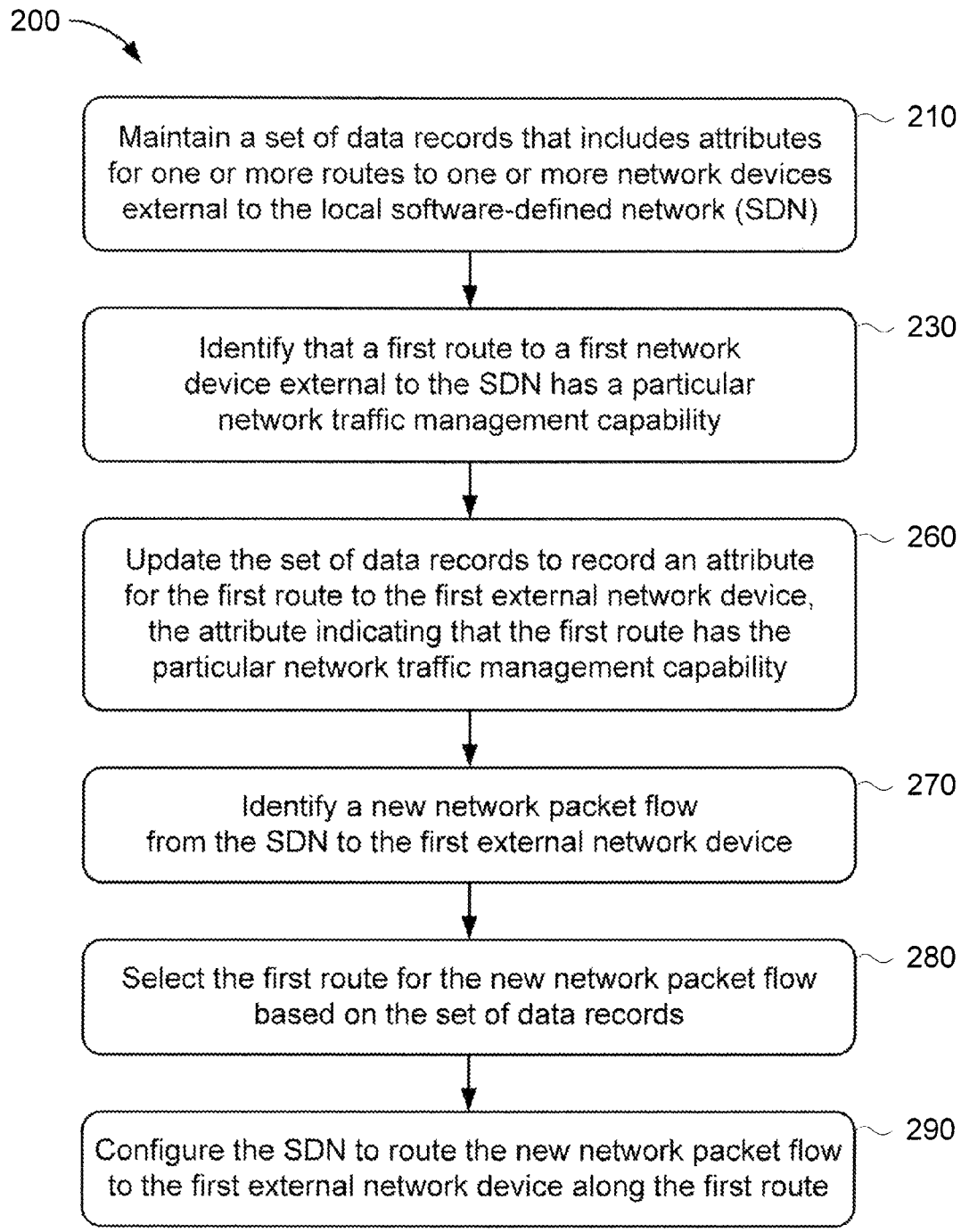
FIG. 2 is a flowchart for a method of monitoring network traffic in a network to identify properties of routes external to the network.

FIG. 2 is a flowchart for a method 200 of monitoring, by an SDN controller, network traffic traversing the SDN to identify properties of routes external to the SDN. In brief overview, the method 200 includes maintaining, by the SDN controller, a set of data records that include attributes for one or more routes to one or more network devices external to the local network (stage 210). The SDN controller identifies that a particular route (a "first route") to a network device external to the SDN has a particular network traffic management capability (stage 230), and in response, updates the set of data records to record an attribute for the first route to the external network device indicating that the first route has the identified network traffic management capability (stage 260). The SDN controller subsequently identifies a new network packet flow from the SDN to the external network device (stage 270), and selects the first route for the new network packet flow based on the attribute information recorded in the set of data records (stage 280). Responsive to the selection, the SDN controller configures the SDN to route the new network packet flow along the first route (stage 290).

Referring to FIG. 2 in more detail, the method 200 includes maintaining, by the SDN controller, a set of data records that include attributes for one or more routes to one or more network devices external to the local network (stage 210). For example, the SDN controller 120 illustrated in FIG. 1 maintains data records in memory 128. There are multiple possible routes from the SDN 110, through the carrier networks 160, to the client devices 190 in the client network 180. The data records maintained by the SDN controller 120 identify routes through the different carrier networks 160. For example, the data records may identify a first route "A" through a first carrier network 160$_a$ and a second route "B" through a second carrier network 160$_b$. The SDN controller 120 maintains attribute information in association with identified routes, where the attribute information includes data indicating properties of the various routes. In some implementations, the attribute information indicates whether a particular route has a particular network traffic management capability. In some implementations, only routes with the particular network traffic management capability are maintained. In some implementations, routes are identified by an end device for the route, e.g., a particular client device 190. In some implementations, routes are identified by a last hop network device, e.g., an edge switch 188 for a client network 180 of an end device such as a client device 190.

In the method 200, the SDN controller identifies that a particular route (a "first route") to a network device external to the SDN has a particular network traffic management capability (stage 230). In some implementations, the particular network traffic management capability is exhibited by optional bits set in the header information of packets arriving from an external device along a network route. For example, some routes may have active queue management (AQM) while other routes might not. One indicator of AQM is whether a route provides explicit congestion notification (ECN) in packet flows traversing the route. FIG. 3 illustrates the layout for a typical TCP/IPv4 packet header, including the ECN field. In some implementations, the SDN controller detects that packets arriving at the SDN, from a network device external to the SDN, have ECN bits set in the header information of the arriving packets. The SDN controller identifies that the route traversed by these packets supports ECN, exhibiting support for AQM. In some implementations, the ECN bits are set in response to a request for ECN made by a network device in the SDN. In some implementations, an edge device inserts an ECN request into outgoing network packets.

In response to identifying that a route has a particular network traffic management capability, the SDN controller updates the maintained set of data records (stage 260). The SDN controller records an attribute for the first route to the external network device. The attribute indicates that the first route has the identified network traffic management capability. In some implementations, the route is identified by a particular edge switch, egress port, or next-hop network device used to reach the external network device. In some implementations, the route is identified by a particular edge switch, egress port, or next-hop network device used to reach a last-hop network device and/or network for the external network device. In some implementations, the SDN controller keeps a table of known routes to client networks. In some such implementations, the SDN controller updates attribute information for the route indicating the network traffic management capability. In some implementations, the SDN controller maintains a table of client networks; and the SDN controller records, for each client network in the table, which routes have the network traffic management capability. In some implementations, the SDN controller records that routes through a particular neighbor network (a carrier network to which the SDN has a direct interconnect) to a client network have the network traffic management capability.

Figure 4:
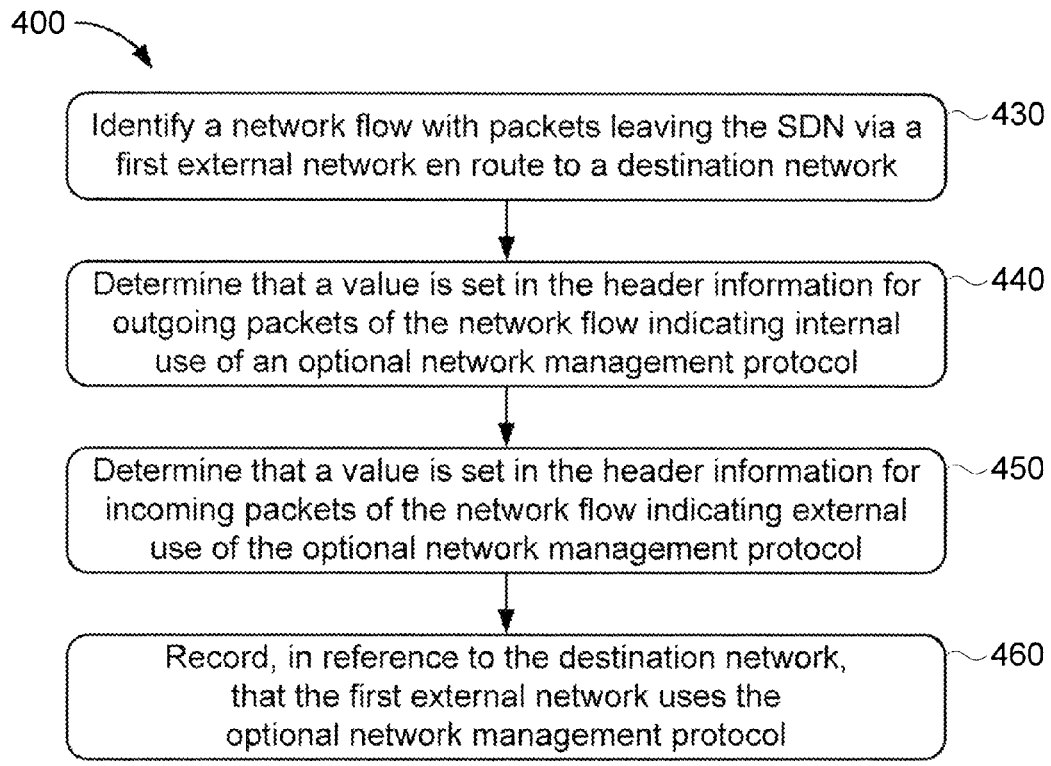
FIG. 4 is a flowchart for a method of identifying and recording that a particular network route uses an optional network traffic management protocol.

In some implementations, stages 230 and 260 are performed using the method 400 shown in FIG. 4.

Referring back to FIG. 2, the SDN controller identifies a new network packet flow from the SDN to the external network device (stage 270), and selects the first route for the new network packet flow based on the attribute information recorded in the set of data records (stage 280). That is, the SDN controller selects a route for the new flow based on which routes have the particular network traffic management capability. In some implementations, the SDN controller determines whether the new network packet flow will benefit from use of a route with the network traffic management capability and, if so, selects a route that has previously exhibited the network traffic management capability based on the route attribute information included in the maintained set of data records. In some implementations, if the new network packet flow would not directly benefit from use of a route with the network traffic management capability, the SDN controller selects a route that has not previously exhibited the network traffic management capability. This allows the SDN controller an opportunity to test the alternative route and to avoid using bandwidth of routes with the network traffic management capability. Examples of network packet flows that might benefit from a network traffic management capability such as active queue management (AQM) are longer transmissions with high tolerance for out-of-order packet delivery and packet loss or retransmission, e.g., certain implementations of VoIP over UDP or large file transfers over TCP. Examples of network packet flows that might not derive a direct benefit from a network traffic management capability such as AQM are other implementations of VoIP, e.g., with fixed size codecs, or shorter transmissions where the transmission protocol doesn't reach a congestion avoidance stage. In some implementations, a new network packet flow is identified by the SDN controller upon detection, by the SDN controller, of an exchange of packets initiating a new flow according to an OSI transport-layer protocol such as TCP or SCTP. In some implementations, the SDN controller uses pattern matching to recognize each flow through the SDN and identifies a new flow as one for which the SDN controller does not already have a pattern.

Responsive to the selection, the SDN controller configures the local network to route the new network packet flow along the first route (stage 290). For example, referring to FIG. 1, if the SDN controller 120 determines that the new network packet flow should use route "A" through a first carrier network $160_a$ with the network traffic management capability, then the SDN controller 120 can configure one or more internal switches 132 of the local network 110 to route the flow to an edge switch $134_a$ with an interconnect 154 to the first carrier network $160_a$. In some implementations, the SDN controller 120 configures the edge switch $134_a$ to route the flow to a next-hop network device in the selected carrier network $160_a$, e.g., the carrier network's edge switch $164_a$.

Figure 5:
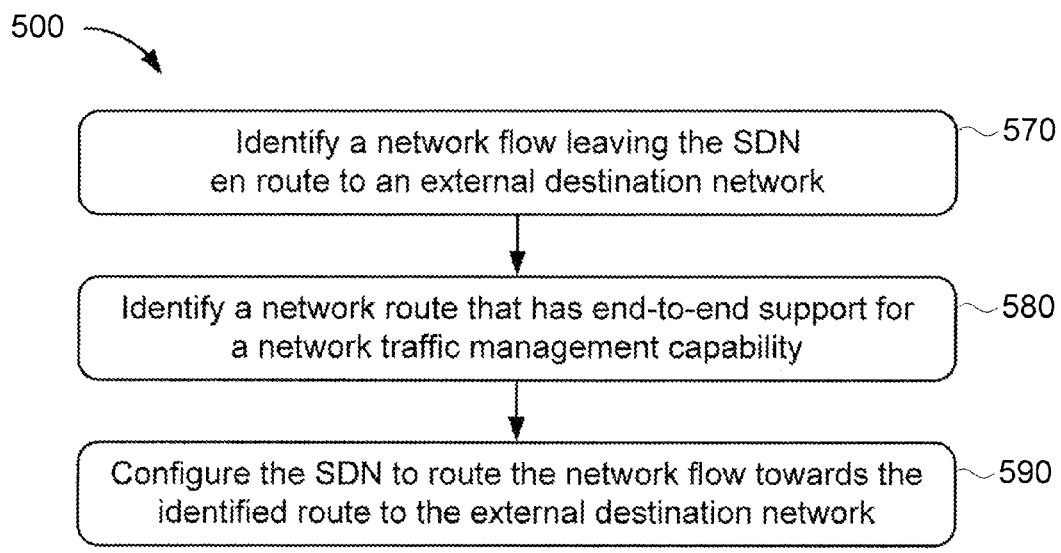
FIG. 5 is a flowchart for a method of selecting a network route through a particular intermediary network based on whether the intermediary network has a particular network traffic management capability.

In some implementations, stages 270, 280, and 290 of the method 200 are performed using the method 500 shown in FIG. 5.

FIG. 3 shows the format 310 for the headers of a typical TCP/IPv4 packet transmitted via Ethernet. In broad overview, the illustrated format includes an Ethernet frame 320, an Internet Protocol (IP) version 4 header 340, a transmission control protocol (TCP) header 370, and the beginning of the encapsulated data 390, i.e., the payload.

Referring to FIG. 3 in more detail, a TCP/IPv4 packet begins with a new packet preamble and delimiter, most of which is not shown. After the delimiter, an Ethernet frame header 320 includes a media access control (MAC) address for the packet's immediate destination (i.e., the network device receiving the packet) and a MAC address for the packet's immediate source (i.e., the network device transmitting the packet). A MAC address is 48 bits, or six 8-bit octets. The Ethernet frame header 320 also includes a 16-bit "Ethertype" indicator, which may indicate the size of the frame or the protocol for the Ethernet payload (i.e., the next level protocol). The Ethernet frame header 320 is followed by the Ethernet payload, which begins with a header for the encapsulated packet. This is illustrated in FIG. 3 as an IPv4 header 340. The first four bits of the IP header 340 indicate the Internet Protocol version (i.e., 4). The next sets of bits indicate the header length (IHL), six bits as flags for differentiated service requirements (DSCP), two bits for explicit congestion notification (ECN), a length for the IP packet, a packet identification shared across packet fragments, IP flags, and a fragment offset.

In some implementations, the ECN field 336 is used to provide explicit congestion notification (ECN) for congestion encountered by a packet. See, for example, "Internet RFC 3168," issued September 2001. The ECN field 336 is the two bits that immediately follow the differentiated services (DSCP) field in IPv4. Each network device that handles a packet along a network route can update the header information. There are four possible values for the two bits of the ECN field 336: Both bits can be zero (00), exactly one bit can be zero (01 or 10), or both bits can be one (11). A packet with both bits set to zero (00) has encountered at least one network device that is not ECN capable or that is not actively supporting ECN. Generally, network devices that are not ECN capable, or do not support ECN, will clear the ECN field 336 by setting the two bits of the ECN field 336 to zero. A packet with at least one bit set to one (01, 10, or 11) has passed through a network path where every network device is implementing ECN. A network participant requesting explicit congestion notification sets just one bit in the ECN field 336 to one (01 or 10), and a congested ECN-capable network device receiving such an ECN request will set both bits to one (11). That is, a packet with both bits set to one (11) has encountered network congestion. Only network devices implementing some form of active queue management (AQM) can be ECN-capable.

A network device that is receiving a large amount of network traffic may be unable to forward the traffic at a sufficiently high rate, and may fail to forward (i.e., "drop") some network packets. An ECN-capable network device that is failing to forward (dropping) some packets, or that is receiving an amount of network traffic that may soon cause it to drop packets, will set both of the bits of the ECN field 336 to one (11) on packets received with either of the two ECN bits set to one (01, 10, or 11). Although the ECN indicator bits are implemented at the OSI Internet layer, the expectation is that OSI transport layer protocols such as TCP, UDP, or SCTP, will observe the congestion notification (11), and reduce flow rates accordingly. This decreases the load level for the congested network device, reducing the number of non-delivered "dropped" packets. IPv6 has a "Traffic Class" field that is similar to the IPv4 differentiated services (DSCP) field. In some implementations, in IPv6, the last two bits (the least significant bits) of the Traffic Class field are used for explicit congestion notification.

Still referring to FIG. 3, after the packet fragmentation bits, the IPv4 header 340 indicates a time to live (TTL) for the packet, which may be measured in time (e.g., seconds) or hops (number of network devices that can forward the packet). The TTL can be used to detect congestion, but is not an explicit congestion notifier. After the TTL, the IPv4 header 340 indicates the protocol for the next level encapsulated packet. For example, a value of 1 indicates the Internet control message protocol (ICMP), 6 indicates TCP, 17 indicates the user datagram protocol (UDP), and 132 indicates SCTP. The IPv4 header 340 further includes a header checksum, which must be recalculated every time the header changes, e.g., whenever the TTL is updated. The IPv4 header 340 next specifies a 32-bit source address and a 32-bit destination address. Additional header fields may be used, but may be omitted and are not shown in FIG. 3.

After the IPv4 header 340, FIG. 3 shows a TCP header 370. The typical TCP header begins with a 16-bit source port identifier and a 16-bit destination port identifier. A TCP port is a virtual port, typically used to indicate the type of data in the payload so that the receiver can pass the packet to the correct application. The TCP header 370 then specifies sequencing information including a sequence number for the packet, an acknowledgement number, and a data offset. The TCP header 370 includes control flags, e.g., SYN, FIN, and ACK, and additional control information such as the window size, a checksum, and other options. The encapsulated data 390 begins after the TCP header 370.

FIG. 4 is a flowchart for a method 400 of identifying and recording that a particular network route uses an optional network management protocol. In brief overview of the method 400, an SDN controller identifies a network flow with packets leaving the SDN via a first external network en route to a destination network (stage 430). The SDN controller determines whether a value is set in the header information for packets of the network flow leaving the SDN indicating internal use, or request for use, of an optional network management protocol (stage 440). The SDN controller then determines whether a value is set in the header information for packets of the network flow arriving at the SDN indicating external use of the optional network management protocol (stage 450). If values are set in the header information for packets of the network flow indicating end-to-end use of the optional network management protocol, the SDN controller records, in reference to the destination network (or in reference to a device in the destination network), that the first external network en route to the destination network uses the optional network management protocol (stage 460). In some implementations of the method 200 shown in FIG. 2, stages 230 and 260 are performed using the method 400 shown in FIG. 4.

Referring to FIG. 4 in more detail, the method 400 begins with an SDN controller identifying a network flow with packets leaving the SDN via a first external network en route to a destination network (stage 430). For example, in some implementations, the SDN controller 120 illustrated in FIG. 1 receives information about network traffic in the SDN 110 via the control plane 112. In some implementations, an SDN edge switch 134$_a$ or 134$_b$ notifies the SDN controller 120 of a new network flow with packets leaving the SDN 110. In some implementations, the new network flow follows an OSI transport protocol that begins with a handshake routine. For example, TCP flows begin with a three-packet exchange (SYN, SYN-ACK, and ACK). In some implementations, the SDN controller 120 detects this handshake and identifies a new flow. In some implementations, an SDN network device detects this handshake and reports it to the SDN controller 120, which then identifies a new flow. The new flow may be characterized by a network destination indicated in outgoing packets. The new flow may be characterized by a network address or network mask for a network destination indicated in outgoing packets. The new flow may be characterized by the network of the destination indicated in outgoing packets.

The SDN controller determines whether a value is set in the header information for packets of the network flow leaving the SDN indicating internal use, or request for use, of an optional network management protocol (stage 440). In some implementations, the optional network management protocol is explicit congestion notification (ECN). In some implementations, each edge switch 134$_a$ and 134$_b$ is configured to set the bits of the ECN field in the packet headers of the flow to the status of an ECN request (either 01 or 10), unless already set to an ECN status (01, 10, or 11). As an example, the layout for TCP over IPv4 is shown in FIG. 3, with the ECN field 336 indicated. In some implementations, the SDN controller 120 identifies flows that originated with an ECN request already set. In some implementations, the SDN controller maintains a data record (e.g., a table or array) of flows with an ECN request set in outgoing packets.

The SDN controller then determines whether a value is set in the header information for packets of the network flow arriving at the SDN indicating external use of the optional network management protocol (stage 450). In some implementations, the optional network management protocol is ECN. Generally, network devices that do not implement ECN will set the bits of the ECN field to zero. For example, network devices may recreate an IP header in order to update the TTL and/or a checksum. Only network devices that implement ECN will retain values set in the ECN field. If packets arrive at the SDN from external networks with at least one bit set in the ECN field, this indicates use of the ECN protocol. Use of the ECN protocol indicates end-to-end support for active queue management (AQM). In some implementations, the SDN controller 120 matches the received packets with a data record (e.g., a table or array) of flows with an ECN request set in outgoing packets, and the SDN controller 120 determines that the flow is ECN-capable end-to-end. It does not matter if the ECN field indicates actual congestion encountered (an ECN value of 11) or merely a request for congestion notification (an ECN value of 01 or 10).

If values are set in the header information for packets of the network flow indicating end-to-end use of the optional network management protocol, the SDN controller 120 records, in reference to the destination network (or in reference to a device in the destination network), that the first external network en route to the destination network uses the optional network management protocol (stage 460). In some implementations, the SDN controller 120 records this information as an attribute to a network path or route to the destination network or device in the destination network. In some implementations, the SDN controller 120 records this information in memory 128.

FIG. 5 is a flowchart for a method 500 of selecting a network route through a particular intermediary network based on whether the intermediary network has a particular network traffic management capability. In brief overview of the method 500, an SDN controller identifies a new network flow with packets leaving the SDN en route to an external destination network (stage 570). The SDN controller then identifies a route through the network to the destination network that has end-to-end support for the network traffic management capability (stage 580), and configures the SDN to route the network flow towards the identified route to the external network (stage 590). In some implementations of the method 200 shown in FIG. 2, stages 270, 280, and 290 are performed using the method 500 shown in FIG. 5.

Referring to FIG. 5 in more detail, the method 500 begins with an SDN controller (e.g., an SDN controller 120 as illustrated in FIG. 1) identifying a new network flow with packets leaving the SDN en route to an external destination network (stage 570). The SDN controller identifies the new network flow in the same manner described in reference to stage 430 of the method 400 illustrated in FIG. 4. In some implementations, the SDN controller 120 also identifies whether the new network flow would benefit from use of an optional network traffic management capability.

The SDN controller then identifies a route through the network to the destination network that has end-to-end support for the network traffic management capability (stage 580). In some implementations, the SDN controller 120 determines if the destination network is one for which a route has been identified using an optional network management protocol that indicates end-to-end support for the network traffic management capability. For example, in some implementations, the network traffic management capability is active queue management (AQM). Support for AQM is indicated by end-to-end support for explicit congestion notification (ECN). In some implementations, the SDN controller 120 compares address information for the destination network to the information recorded in stage 460 of the method 400 illustrated in FIG. 4.

If there is a route to the destination network with end-to-end support for the network traffic management capability, the SDN controller configures the SDN to route the network flow using the identified route to the external network (stage 590). In some implementations, the SDN controller only configures the SDN to use the route if the flow will benefit from use of the end-to-end support for the network traffic management capability. In some implementations, the SDN controller 120 configures the SDN 110 to use the route, e.g., by installing appropriate table entries in the network elements along the path. In some implementations, the SDN controller 120 configures the SDN 110 to use the route by configuring edge switches 134a and $134_b$ to forward packets of the flow to an external network 160 in the identified route. In some implementations, the SDN 110 configures network devices along the route, e.g., internal switches 132, to forward packets of the flow to an edge switch 134a or $134_b$ with an interconnect 154 to a network 160 in the identified route.

FIG. 6 is a block diagram of an example software-defined network controller 620 and network device 630 separated by a control plane link 112. In broad overview, the SDN controller 620 includes a control module 642 and memory 648, e.g., for storing network configuration and routing data. The network device 630 includes a control module 644 and memory 636, e.g., for storing device configuration and routing data. The network device 630 includes a forwarding engine 638 that uses the device configuration and routing data stored in memory 636 to manage data traffic at network interfaces 680. The SDN controller 620 is suitable for use as the SDN controller 120 illustrated in FIG. 1. The network device 630 is suitable for use as any of the internal switches 132 or edge switches $134_a$ and $134_b$ illustrated in FIG. 1.

Referring to FIG. 6, in more detail, the SDN controller 620 includes a control module 642 and memory 646. The control module 642 uses network configuration and routing data stored in the memory 646 to configure the network device 630. In some implementations, the control module 642 periodically sends a status or availability message to the network device 630. In some implementations, the SDN controller 620 includes additional application modules, not shown.

The network device 630 includes a control module 644 and memory 636. The network device control module 644 receives configuration and routing information from the SDN controller control module 642 (via the control plane 112) and updates the data stored in memory 636.

The network device 630 includes a set of network interfaces 638. Each network interface 638 may be connected to a data plane 116 (as shown in FIG. 1). External devices send data packets to the network device 630, via the data plane 116 and a first network interface (e.g., network interface $638_a$). The network device 630 forwards received data packets to an appropriate next-hop via another interface (e.g., network interface $638_b$). In some implementations, the forwarding engine 634 determines which network interface 638 to use for forwarding each data packet received.

The forwarding engine 634 uses configuration and routing data in memory 636 to manage the data traffic at network interface ports 638. The configuration and routing data in memory 636 are controlled by the SDN controller 620 via the control module 644. In some implementations, the forwarding engine 634 updates packet headers before forwarding packets to an egress network interface port 638. For example, the forwarding engine 634 may update ECN, TTL, or checksum information in packet headers.

The memory 636 and the memory 646 may each be any device suitable for storing computer readable data. Examples include, but are not limited to, semiconductor memory devices such as EPROM, EEPROM, SRAM, and flash memory devices. In some implementations, the memory 636 of a network device 630 includes memory dedicated to buffering packet flows as they traverse the network device 630. A network device 630 may have any number of memory devices 636. An SDN controller 620 may have any number of memory devices 646.

FIG. 7 is a block diagram of a computing system 910 suitable for use in implementing the computerized components described herein. In broad overview, the computing system 910 includes at least one processor 950 for performing actions in accordance with instructions, and one or more memory devices 970 and/or 975 for storing instructions and data. The illustrated example computing system 910 includes one or more processors 950 in communication, via a bus 915, with memory 970 and with at least one network interface controller 920 with a network interface 922 for connecting to external network devices 924, e.g., participating in a network (such as the networks 110, 160, and 180 shown in FIG. 1). The one or more processors 950 are also in communication, via the bus 915, with any I/O devices at one or more I/O interfaces 930, and any other devices 980. The processor 950 illustrated incorporates, or is directly connected to, cache memory 975. Generally, a processor will execute instructions received from memory.

In more detail, the processor 950 may be any logic circuitry that processes instructions, e.g., instructions fetched from the memory 970 or cache 975. In many embodiments, the processor 950 is a microprocessor unit or special purpose processor. The computing device 910 may be based on any processor, or set of processors, capable of operating as described herein. The processor 950 may be a single core or multi-core processor. The processor 950 may be multiple processors.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 910 may have any number of memory devices 970.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interface 922. The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. In some implementations, the network interface 922 is a connection point for a physical network link, e.g., an RJ 45 connector. In some implementations, the network interface controller 920 supports wireless network connections and an interface port 922 is a wireless receiver/transmitter. Generally, a computing device 910 exchanges data with other computing devices 924 via physical or wireless links to a network interface 922. In some implementations, the network interface controller 920 implements a network protocol such as Ethernet.

The other computing devices 924 are connected to the computing device 910 via a network interface port 922. The other computing device 924 may be a peer computing device, a network device, or any other computing device with network functionality. For example, a computing device 924 may be a network device such as a hub, a bridge, a switch, or a router, connecting the computing device 910 to a data network such as the Internet.

In some uses, the I/O interface 930 supports an input device and/or an output device (not shown). In some uses, the input device and the output device are integrated into the same hardware, e.g., as in a touch screen. In some uses, such as in a server context, there is no I/O interface 930 or the I/O interface 930 is not used. In some uses, additional other components 980 are in communication with the computer system 910, e.g., external devices connected via a universal serial bus (USB).

The other devices 980 may include an I/O interface 930, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 910, e.g., a touch screen on a tablet device. In some implementations, a computing device 910 includes an additional device 980 such as a co-processor, e.g., a math co-processor that can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method comprising:
   maintaining, by a first network device in a first network, a set of data records that includes attributes for one or more routes to one or more network devices external to the first network;
   identifying, by the first network device in the first network, that a first route from among one or more routes to a second network device external to the first network utilizes active queue management;
   updating, by the first network device, the set of data records to record an attribute for the first route to the second network device that indicates that the first route utilizes active queue management outside the first network;
   selecting, by the first network device, for a new network packet flow from the first network to the second network device, the first route from among the one or more routes to the second network device based on the first route having the recorded attribute indicative that the first route utilizes active queue management and a recorded attribute for at least one other route to the second network device indicating that the at least one other route does not utilize active queue management outside the first network; and routing, by the first network device, the new network packet flow to an external network via the first route.

2. The method of claim 1, wherein the first network is a software-defined network (SDN) and the first network device is an SDN controller in the first network, the method further comprising:

configuring, by the first network device, the SDN to route the new network packet flow to the external network via the first route.

3. The method of claim 1, further comprising:

determining, by the first network device in the first network, that a second route to the second network device external to the first network does not have the network traffic management capability.

4. The method of claim 1, wherein identifying, by the first network device, that the first route to the second network device external to the first network utilizes active queue management comprises:

detecting use of explicit congestion notification (ECN) indicators in a flow that uses the first route.

5. The method of claim 4, comprising inserting, by the first network device, into the flow that uses the first route, an ECN request indicator.

6. The method of claim 1, wherein the first network is a software-defined network (SDN) and the first network device is an SDN controller in the first network, the method further comprising:

receiving, by the first network device, from a network device within the SDN, an indicator that a flow that uses the first route is using an explicit congestion notification (ECN) protocol.

7. The method of claim 6, comprising inserting, by an SDN network device controlled by the first network device, an ECN request indicator into an outgoing packet of the flow that uses the first route;

removing, by the SDN network device controlled by the first network device, an ECN request indicator from an incoming packet of the flow that uses the first route; and sending, by the SDN network device, a message to the first network device indicating that the flow that uses the first route is using ECN.

8. The method of claim 7, wherein the SDN network device controlled by the first network device is a gateway or an edge switch.

9. The method of claim 1, comprising:

determining, by the first network device, if the new packet flow would benefit from the active queue management; and selecting the first route for the new network packet flow to the second network device based in part on a determination that the new network packet flow would benefit from the active queue management.

10. A system comprising:

a first network device in a first network, the first network linked by interconnects to a plurality of third-party networks through which the network device can send packets to, and receive packets from, a second network device external to the first network, the first network device configured to:

maintain a set of data records that includes attributes for one or more routes to one or more network devices external to the first network;

identify that a first route from among one or more routes to the second network device external to the first network utilizes active queue management;

update the set of data records to record an attribute for the first route to the second network device that indicates that the first route utilizes active queue management outside the first network;

select, for a new network packet flow from the first network to the second network device, the first route from among the one or more routes to the second network device based on the first route having the recorded attribute indicative that the first route utilizes active queue management and a recorded attribute for at least one other route to the second network device indicating that the at least one other route does not utilize active queue management outside the first network; and route the new network packet flow to an external network via the first route.

11. The system of claim 10, wherein the first network is a software-defined network (SDN) and the first network device is an SDN controller in the first network, the first network device further configured to transmit configuration methods to the SDN to route the new network packet flow to the external network via the first route.

12. The system of claim 10, wherein the first network device is configured to determine that a second route to the second network device external to the first network does not have the network traffic management capability.

13. The system of claim 10, wherein identifying, by the first network device, that the first route to the second network device external to the first network utilizes active queue management comprises:

detecting use of explicit congestion notification (ECN) indicators in a flow that uses the first route.

14. The system of claim 13, wherein the first network device is configured to insert, into the flow that uses the first route, an ECN request indicator.

15. The system of claim 10, wherein the first network is a software-defined network (SDN) and the first network device is an SDN controller in the first network configured to:

receive, from a network device within the SDN, an indicator that a flow that uses the first route is using an explicit congestion notification (ECN) protocol.

16. The system of claim 15, further comprising an SDN network device controlled by the first network device, the SDN network device configured to:

insert an ECN request indicator into an outgoing packet of the flow that uses the first route;

remove an ECN request indicator from an incoming packet of the flow that uses the first route; and send a message to the first network device indicating that the flow that uses the first route is using ECN.

17. The system of claim 16, wherein the SDN network device controlled by the first network device is a gateway or an edge switch.

18. The system of claim 10, wherein the first network device is configured to:

determine if the new packet flow would benefit from the active queue management, and select the first route for the new network packet flow to the second network device based in part on a determination that the new network packet flow would benefit from the active queue management.

* * * * *